United States Patent [19]

Barsumian

[11] Patent Number: 5,020,137
[45] Date of Patent: May 28, 1991

[54] CASE-MOUNTED RECEIVER WITH ANTENNA

[76] Inventor: Bruce R. Barsumian, 890 Dago Rd., Cookeville, Tenn. 38501

[21] Appl. No.: 468,647

[22] Filed: Jan. 23, 1990

[51] Int. Cl.⁵ .............................................. H04B 1/08
[52] U.S. Cl. ..................................... 455/90; 455/347; 343/702
[58] Field of Search ................... 455/89, 90, 347, 351, 455/278; 343/702; 361/359, 391, 395, 399; 190/16, 17, 109, 110–112; 312/7.1

[56] References Cited

U.S. PATENT DOCUMENTS

| | | | |
|---|---|---|---|
| 3,179,891 | 4/1965 | Sharma | 455/351 |
| 3,199,643 | 8/1965 | Korchmar | 190/16 |
| 4,232,390 | 11/1980 | McEvelly, Jr. | 455/89 |
| 4,313,119 | 1/1982 | Garay et al. | 343/702 |
| 4,644,366 | 2/1987 | Scholz | 343/702 |
| 4,677,654 | 6/1987 | Lagin et al. | 455/89 |
| 4,742,568 | 5/1988 | Furugo | 455/278 |
| 4,817,191 | 3/1989 | Adams | 455/347 |
| 4,942,622 | 4/1990 | Takayama et al. | 455/278 |

OTHER PUBLICATIONS

SPC-95 Comprehensive Inch/Metric Service Kit, Specialized Products Company, p. 14, Fall 87.

SPC Wing Pallet Case w/Foam, Specialized Products Company, p. 26, Fall 87.

Primary Examiner—Reinhard J. Eisenzopf
Assistant Examiner—Lisa Charouel
Attorney, Agent, or Firm—Luedeka, Hodges, Neely & Graham

[57] ABSTRACT

A receiver assembly for detecting electromagnetic waves or signals over a board frequency range includes a receiver, associated antennas and a carrying case within which the receiver and antennas are contained. The carrying case includes first and second side portions and a carrier board which are hingedly connected together for movement between a condition for storage and a condition for use at which the carrier board is positioned remote of the first case side portion. The antennas are mounted upon the carrier board, and the receiver is mounted within the first side portion of the case so that when the assembly is opened for use, the antennas are supported by the case remote of the receiver. The likelihood of noise production by the receiver circuitry due to the closeness of the antennas to the circuitry and the likelihood that an operator of the receiver will interfere with or distort signals that are transmitted toward the antennas are substantially reduced by the aforementioned support of the antennas remote of the receiver circuitry.

8 Claims, 2 Drawing Sheets

CASE-MOUNTED RECEIVER WITH ANTENNA

BACKGROUND OF THE INVENTION

This invention relates generally to receiving devices for converting electromagnetic waves or signals into audio or visual form and relates more particularly to such a receiver having an antenna and associated receiver circuitry.

It is known that the receiver circuitry of a common receiver device may produce noise if the antenna associated with the receiver device is positioned in close proximity to the circuitry. It is also known that an operator of the receiver who is standing too close to the antenna may interfere with or distort signals that would ordinarily be detected by the antenna.

It would be desirable to provide a receiver device having an antenna and associated circuitry which when set up for use are disposed in such a positional relationship to one another that the likelihood that the receiver circuitry will produce interference noise in the receiver as a consequence of the closeness of the antenna to the circuitry or that an operator who operates the receiver will interfere with signals transmitted toward the antenna is substantially reduced. It would also be desirable that such an antenna is capable of being easily transported between sites of use.

Accordingly, it is an object of the present invention to provide a new and improved receiver assembly including an antenna and associated receiver circuitry which are capable of being moved relative to one another between a condition of non-use for storage or easy transport of the assembly and a condition of use at which the antenna is disposed remote of the receiver circuitry to reduce the likelihood of interference noise produced by the circuitry or the interference of signals moving toward the antenna by an operator of the receiver.

SUMMARY OF THE INVENTION

This invention resides in a receiver assembly having an antenna and associated receiver circuitry for converting electromagnetic and optical waves or signals into audio or visual form.

The receiver assembly includes a carrying case having first and second side portions which are hingedly joined to one another along adjacent edges for movement between opened and closed conditions. The first of the case side portions provides a receptacle having an opening which is covered by the second side portion when the first and second side portions are in the closed condition, and the case further includes a carrier board hingedly joined to the second side portion for movement between a condition of non-use at which the board and second side portion are folded together into a compact arrangement and a condition of use at which the board and second side portion are arranged so as to form a relatively large angle therebetween.

The assembly also includes a receiver mounted within the receptacle of the first case side portion so that when the first and second side portions are in the opened condition, the receiver is exposed for use. Connected to the receiver are antenna means for detecting electromagnetic and optical signals for transmission to the receiver. The antenna means is supportedly attached to the carrier board for movement therewith as the board is moved between its conditions of use and non-use so that when the first and second case side portions are in the opened condition and the carrier board is positioned in its condition of use, the antenna means is positioned remote of the receiver. Therefore, the likelihood that interference noise will be produced by the receiver due to the closeness of the antenna means to the receiver is substantially reduced, and the likelihood of interference or distortion of signals transmitted toward the antenna by an operator of the receiver is also reduced.

DETAILED DESCRIPTION OF THE ILLUSTRATED EMBODIMENT

Figure 1:
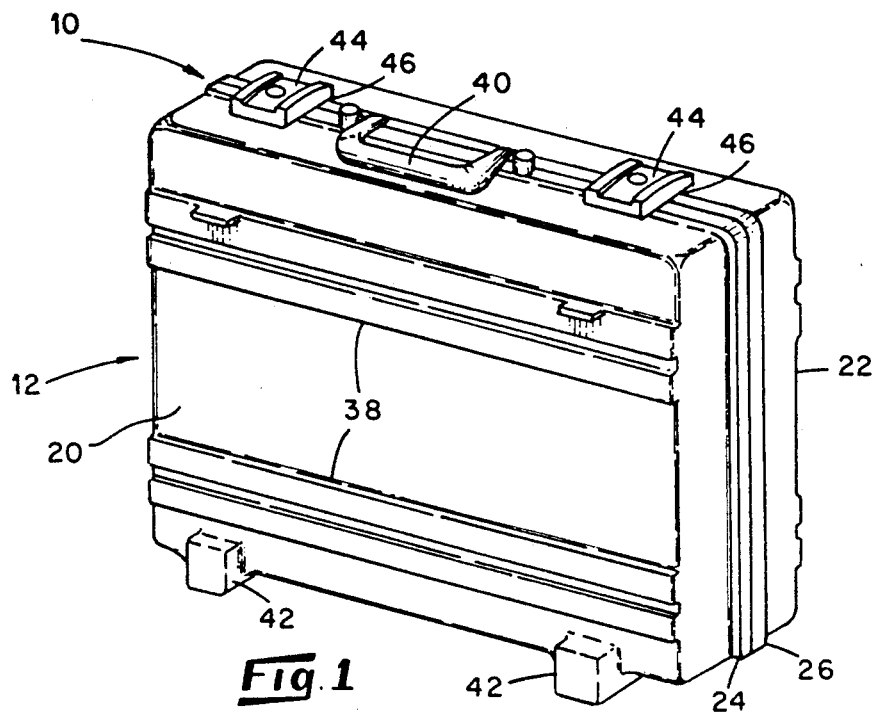
FIG. 1 is a perspective view of the receiver assembly illustrating its case when closed and positioned upright.
Figure 2:
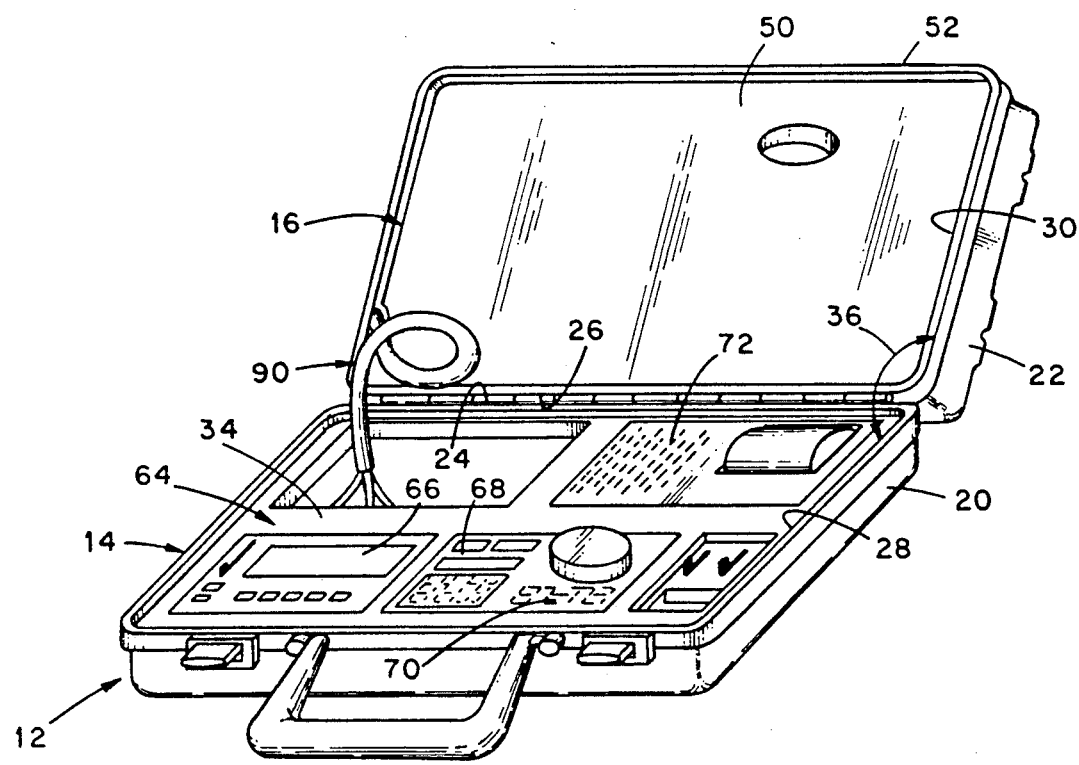
FIG. 2 is a perspective view of the FIG. 1 assembly illustrating its case when opened and positioned so that the receiver mounted therein is exposed for use and illustrating the antenna-carrying board of the case in its position of non-use.
Figure 3:
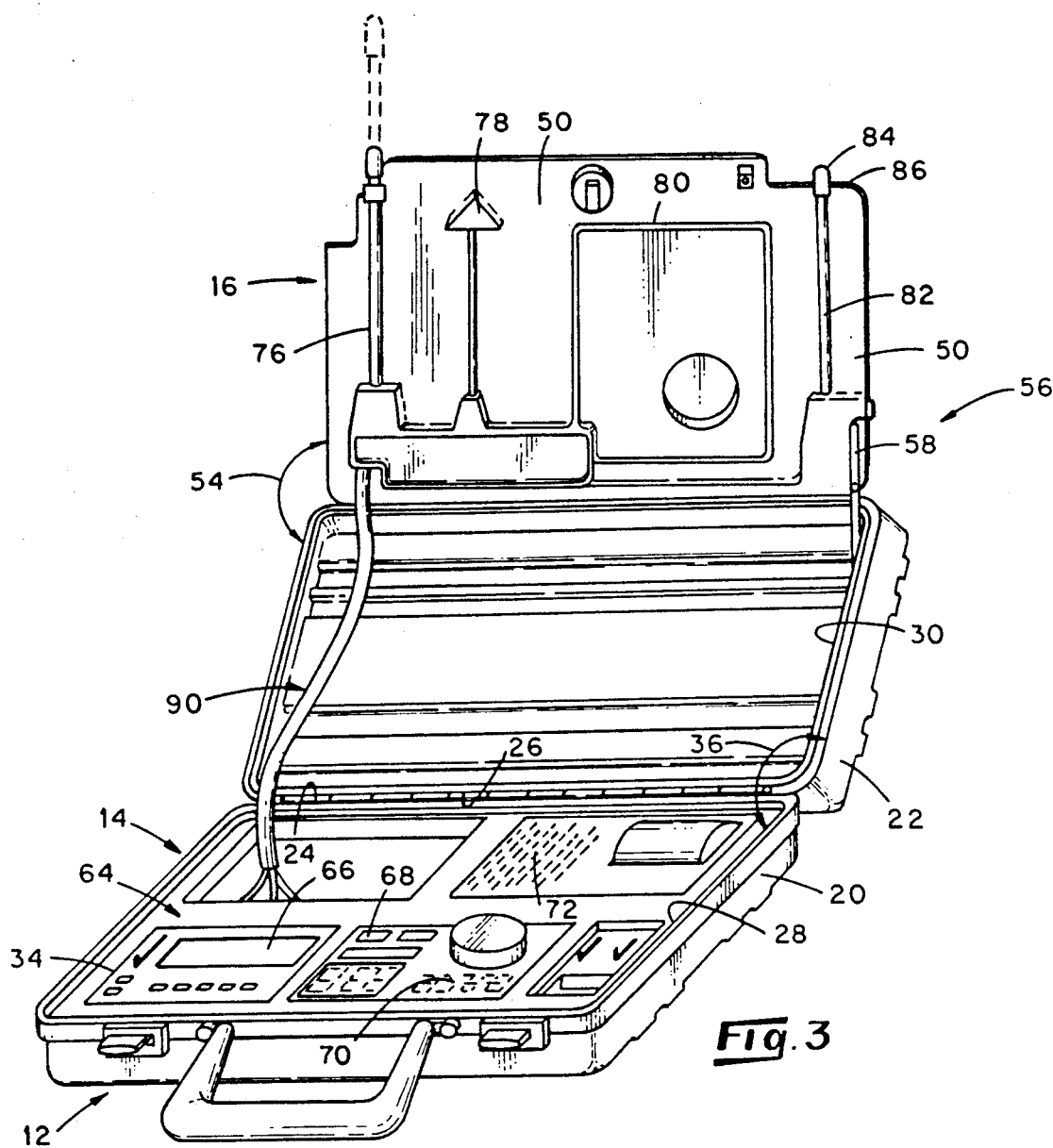
FIG. 3 is a perspective view of the assembly illustrating its case when opened and illustrating the antenna-carrying board of the case in its position of use.

Turning now to the drawings in greater detail, there is shown in FIGS. 1-3 a receiver assembly, generally indicated 10, having a case 12, a receiver 14 (FIG. 2) and associated antenna means 16 (FIG. 3) mounted with the case 12. In the interests of this invention, the receiver 14 includes receiver circuitry for receiving signals from the antenna 16 and converting the received signals into audio and visual form.

The case 12 may be opened and closed between the FIG. 1 closed condition for carrying or storage purposes and the FIG. 3 opened condition for use of the receiver 14. As is apparent herein, the case 12 supports the antenna means 16 and receiver 14 in such a relationship to one another that when the case 12 is opened to its FIG. 3 opened condition, the likelihood that interference noise which may otherwise be produced by the receiver 14 due to the proximity of the antenna means 16 to the receiver 14 is substantially reduced and that the likelihood of interference or distortion of signals transmitted toward the antenna means 16 is also reduced.

The depicted receiver assembly 10 is used in the detection of electronic bug transmitters or telephone taps and to this end, is a highly sensitive instrument capable of detecting electromagnetic and optical waves over a relatively broad range of frequencies. However, it will be understood that other types of receivers and antennas for use in other applications may be substituted for the receiver 14 and antenna means 16 in accordance with the broader aspects of the present invention. Accordingly, the principles of the present invention may be variously applied.

With reference to FIGS. 1 and 2, the case 12 of the assembly 10 includes two half or side portions 20, 22 which are hingedly connected together along adjacent edges 24, 26 for movement between a closed condition as illustrated in FIG. 1 and an opened condition as illustrated in FIG. 2. Each side portion 20 or 22 is formed so as to provide a receptacle 28 or 30, respectively, within which either the receiver 14 is mounted or the antenna means 16 is received when stored. When the case 12 is opened for use, one side portion 20 is positioned upon a substantially horizontal surface (not shown) so that its receptacle 28 and the face, indicated 34, in FIG. 2, of the receiver 14 are directed upwardly, and the other side portion 22 is angularly disposed relative to the side portion 20, as shown in FIG. 2, so that the side portions 20, 22 form a relatively large angle indicated 36 in FIG. 2. In the depicted assembly 10, the side portions 20, 22 form an angle 36 of about 160 degrees. To facilitate the carrying of the assembly 10, a handle 40 is hingedly attached to the side portion 20 as shown in FIG. 1. To enable the case 12 to stably stand upright when closed and positioned in the manner illustrated in FIG. 1, the side portions 20, 22 include protruding feet 42.

The receptacle 30 provided by the case side portion 22 has a volume which is about equal to that of the side portion receptacle 28. When the antenna means 16 is folded within the receptacle 30 in the manner illustrated in FIG. 2, a substantial amount of receptacle space is available beneath the antenna means 16 for storage of receiver accessories or other articles.

When the case 12 is in the FIG. 1 closed condition, the side portions 20, 22 provide the assembly 10 with the appearance and approximate size of a conventional briefcase. Thus, the case 12 provides means by which the assembly 10 can be easily transported between sites of use or stored between periods of use. For purposes of securing the case 12 in the FIG. 1 closed condition, cooperating latch elements 44, 46 are suitably mounted on the side portions 20, 22 adjacent the edges thereof opposite the hinged edges 24, 26.

With reference again to FIGS. 2 and 3, the case 12 also includes a carrier board 50 upon which the antenna means 16 is mounted. The carrier board 50 is generally flat in shape and is hingedly connected along one edge to an edge, indicated 52, of the case side portion 22 opposite the side portion edge 26 to which the case side portion 20 is connected. The board 50 is thereby movable relative to the side portion 20 between a stored condition as shown in FIG. 2 at which the board 50 is wholly positioned within the opening of the side portion receptacle 30 and a condition of use as shown in FIG. 3 at which the board 50 forms a relatively large angle 54 with the side portion 22. In the depicted assembly 10, the carrier board 50 and side portion 22 form an angle 54 of about 110 degrees. Consequently, when the case 12 and carrier board 50 are positioned in the FIG. 3 opened position for use, the carrier board 50 and side portion 20 are arranged in a perpendicular relationship.

The board 50 is of relatively rigid construction so that when positioned in the FIG. 2 position for storage, the board 50 provides a self-supporting cover for the cavity of the receptacle 30. Accordingly, the length dimensions of the outer edges of the board 50 are slightly smaller than the corresponding inside dimensions of the side portion 22. In addition, the board 50 provides a suitable divider between the face 34 of the receiver 14 and the cavity of the side portion 22 when the case 12 is positioned in its FIG. 1 closed condition. Therefore, the receiver face 34 is protected by the board 50 from damage by accessories or other articles which may be stored within the covered cavity of the receptacle 30, and the board 50 is advantageous in this respect.

It is a feature of the assembly 10 that when the case 12 is opened and the carrier board 50 is positioned in its FIG. 3 condition of use, the carrier board 50 is oriented generally vertically and elevated with respect to the receiver 14. To this end, the assembly 10 includes stop means, generally indicated 56, associated with the case 12 for limiting the relative movement of the case side portions 20, 22 from the FIG. 1 closed condition to the angularly-related condition illustrated in FIGS. 2 and 3 and for limiting the relative movement of the side portion 22 and carrier board 50 from the FIG. 2 condition for storage to the angularly-related condition of use illustrated in FIG. 3.

Figure 4:
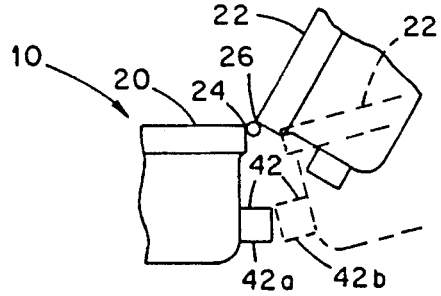
FIG. 4 is a fragmentary side elevational view of one section of the case of the FIG. 1 assembly.

For limiting the relative movement of the case side portions 20, 22 and with reference to FIGS. 1, 2 and 4, the stop means includes the protruding feet 42, introduced earlier, integrally formed adjacent the hinged edges 24, 26 of the side portions 20, 22. As best shown in FIG. 4, the feet 42 include opposing pairs of feet 42a, 42b, one pair of which is formed in side portion 20 and the other pair of which is formed in side portion 22, and which are disposed in such a relation to one another so that movement of the side portions 20, 22 from the closed condition through an intermediate condition, as illustrated in solid lines in FIG. 4, to the opened condition, as illustrated in phantom in FIG. 4, move the feet 42a, 42b in abutting relationship with one another. When in such an abutting relationship, the feet 42a, 42b maintain the case side portions 20, 22 in the angularly-related open condition of FIGS. 2 and 3.

Figure 5:
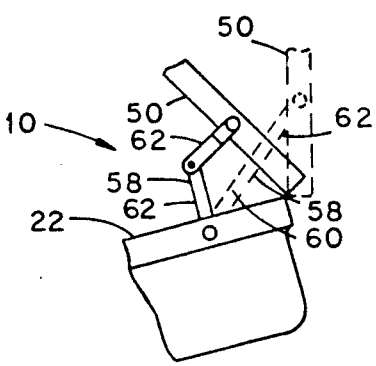
FIG. 5 is a fragmentary side elevational view of another section of the case of the FIG. 1 assembly.

For limiting the relative movement of the carrier board 50 relative to the side portion 22 and with reference to FIGS. 2 and 5, an over-center brace 58 is mounted to one side of the carrier board 50. The brace 58 includes a first hinged elongated leg portion 60 which is pivotally connected to a side of the carrier board 50 and a second hinged elongated leg portion 62 which is pivotally connected to the side portion 22. In addition, the first and second leg portions 60, 62 are hingedly connected to one another so that hinged movement of the board 50 relative to the side portion 22 moves the leg portions 60, 62 from a folded position into a position at which the leg portions 60, 62 are substantially aligned. For the sake of clarity, an intermediate position of the brace leg portions 60, 62 is illustrated in solid lines in FIG. 5 as the board 50 is moved between its condition of use and its condition of storage, and the substantially aligned position of the brace leg portions 60, 62 is illustrated in phantom in FIG. 5 when the board 50 is positioned in its condition for use. It will be understood that when in the aligned position, the brace leg portions 60, 62 support the board 50 substantially vertically.

As mentioned earlier and with reference again to FIGS. 2 and 3, the receiver 14 includes circuitry, generally indicated 64, necessary for converting electromagnetic or optical waves or signals detected by the antenna means 16 to audio and visual form. To this end, the receiver 14 includes a visual display 66 and input devices, such as a key pad 68 and control devices 70. The receiver 14 also includes a speaker 72 mounted to the receiver face 34. In operation, the receiver assembly 10 receives radio frequencies over a relatively broad wavelength range such as, for example, five kilohertz to ten gigahertz and receives infrared light and audio frequency signals and in the form of an input signal. The receiver circuitry 64 analyzes and demodulates the input signal by preselected and known methods and displays the signal on the screen of the graphics video display 66 and/or plays the signal through the speaker 72.

With reference to FIG. 6, the antenna means 16 mounted upon the carrier board 50 includes an active antenna 76 in the form of a broad band non-resonant type active antenna which functions as a voltage probe. The antenna 76 includes an impedance converting amplifier which converts the antenna, which by itself is a high impedance device, to a low impedance device. In the depicted assembly 10, the antenna 76 operates in the range of five to fifteen hundred megahertz and may be extended in a telescoping fashion to the position illustrated in phantom in FIG. 6. Alternatively, bending or folding antennas can be used.

The antenna means also includes a microwave antenna 78 commonly known as a microwave disc-cone antenna. In the depicted assembly 10, the antenna 78 operates in the frequency range from fifteen hundred megahertz to ten gigahertz or higher. The antenna means 16 also includes a loop antenna 80 in the form of a rectangular loop. In the depicted assembly 10, the loop antenna 80 is adapted to receive frequencies ranging from about five kilohertz to about five megahertz.

Still further, the antenna means 16 includes an infrared antenna 82. Mounted at the top of the antenna 82 is a red lens 84 within which are mounted three infrared diodes each having a viewing angle of one hundred and twenty degrees. Appropriately positioned within the antenna 82, the diodes may collectively view a horizontal angle of 360 degrees. The carrier board 50 defines an appropriate notch 86 adjacent the red lens 84 so as to reduce the likelihood that the carrier board 50 will obstruct the view of the antenna 82. Alternatively, the infrared antenna 82 may be mounted on a movable mounting, such as a telescoping rod, to elevate the antenna 82 and provide it with a 360° viewing angle in a substantially horizontal plane.

With reference still to FIG. 6, the antennas 76, 78, 80, 82 are mounted upon the carrier board 50 in a spaced-apart relation so that one antenna mounted on the board 50 does not interfere with another antenna on the board 50. For transmitting signals received by the antenna means 16 to the receiver 14, there is included within the assembly 10 cable means 90 (FIG. 3) comprised of a plurality of conductors appropriately connected between the antenna means 16 and the receiver circuitry 64.

An advantage provided by the assembly 10 relates to the relative disposition of the receiver 14 and the antenna means 16 when the assembly 10 is opened to the FIG. 3 condition for use. More specifically, when the assembly 10 is positioned in the FIG. 3 condition, the antenna means 16 is positioned remote of the receiver 14. In the depicted assembly 10, the antenna means 16 is mounted about one foot from the nearest corner or part of the receiver 14 and is elevated by a few inches above the horizontal level of the receiver face 34. With the antenna means 16 removed from the receiver 14 as aforedescribed, the likelihood that interference noise will be produced by the receiver 14 due to the proximity of the antenna means 16 to the receiver circuitry 64 is substantially reduced. Moreover, because the receiver 14 is removed from the antenna means 16, an operator who operates the assembly 10 ordinarily must stand close to the receiver 14, and hence remote of the antenna means 16, in order to manipulate the receiver control devices 70. Thus, with the receiver 14 removed from the antenna means 16, a receiver operator is less likely to interfere with or distort signals that the antenna means 16 is intended to detect.

Another advantage provided by the assembly 10 relates to the ranges of wavelength frequencies that the receiver 14 and antenna means 16 are adapted to detect. More specifically, the receiver 14 is adapted to scan radio, microwave and infrared frequencies. While sweeping through the infrared frequency, the receiver tunes, demodulates or otherwise analyzes any infrared signal that is received to determine whether any information or broadcast signal is present. The capacity to scan such a broad range of frequencies provides the assembly 10 with an advantage over prior art devices which do not possess such a scanning capacity.

It will be understood that numerous modifications and substitutions can be had to the aforedescribed assembly 10 without departing from the spirit of the invention. For example, the case of a receiver assembly in accordance with the broader aspects of the present invention may include side portions which are adapted to simultaneously rest stably on a horizontal surface when opened for use so that the relatively large angle formed therebetween is about 180 degrees. Accordingly, the assembly 10 is intended for the purpose of illustration and not as limitation.

I claim:

1. A receiver assembly comprising:

a carrying case having first and second side portions which are hingedly joined to one another along adjacent edges for movement between opened and closed conditions, the first of the case side portions providing a receptacle having an opening which is covered by the second side portion when the first and second side portions are in the closed condition, said second side portion having one edge which is hingedly joined to said first side portion and an edge opposite said one edge, said one edge and said opposite edge of said second side portion being substantially parallel to one another;

the case further including a carrier board having an edge which is hingedly joined to said second side portion along said opposite edge thereof for hinged movement between a condition of non-use at which the board and second side portion are positioned together in a compact arrangement and the carrier board fits within the case defined by the first and second side portions when the case is closed and a condition of use at which the board extends outwardly form said second side portion which is about equal to the distance between said one edge and said opposite edge of said second side portion;

a receiver mounted within the receptacle of the first case side portion so that when the first and second side portions are in the opened condition, the receiver is exposed for use; and antenna means operatively connected to the receiver for detecting signals for transmission to the receiver and being supportedly attached to the carrier board for movement therewith as the board is moved between its conditions of use and non-use so that when the first and second case side portions are in the opened condition and the carrier board is positioned in its condition of use, the antenna means are spaced from the receiver by a distance which is at least as great as the distance between said one edge and said opposite edge of said second side portion.

2. The receiver assembly as defined in claim 1 wherein said antenna means is located at least about one foot from the closest part of the receiver.

3. The receiver assembly as defined in claim 1 further including means for maintaining the carrier board and the first side portion at generally a right angle to one another when the case is in its opened condition and the carrier board is in its condition of use so that when the case is opened and placed upon a horizontal support surface so that the opening of the first side portion receptacle is directed upwardly and the carrier board is positioned in its condition of use, the carrier board is oriented generally vertically.

4. The receiver assembly as defined in claim 3 further including means for maintaining the first and second side portions in an angular relationship with respect to one another so that when the case is opened and positioned upon a horizontal support surface as aforesaid, the carrier board and the antenna means mounted thereon are elevated with respect to the first side portion and the receiver mounted therein.

5. The assembly as defined in claim 1 wherein said first and second side portions are hingedly joined to one another for movement about a first pivot axis and said carrier board is hingedly joined to said second side portion for movement about a second pivot axis, and said first and second pivot axes are generally parallel to one another.

6. The assembly as defined in claim 1 wherein said antenna means includes a plurality of antennas wherein each antenna is adapted to detect signals within a preselected frequency range.

7. The assembly as defined in claim 1 wherein said second side portion includes a receptacle having a storage cavity for accepting articles placed therein and the carrier board is adapted to cover said receptacle cavity when the board is in its condition of non-use so that the receiver is protected from damage from articles placed within the storage cavity by the carrier board when the case is in its closed condition.

8. The assembly as defined in claim 1 wherein said antenna means includes at least one antenna and a movable mounting associated therewith so that when the first and second side portions are positioned in the opened condition upon a horizontal surface and the carrier board is positioned in its condition of use, said one antenna may be elevated by said movable mounting to a position at which the antenna is provided with a 360 degree viewing angle in a substantially horizontal plane.

* * * * *

UNITED STATES PATENT AND TRADEMARK OFFICE
CERTIFICATE OF CORRECTION

PATENT NO. : 5,020,137

DATED : May 28, 1991

INVENTOR(S) : Bruce R. Barsumian

It is certified that error appears in the above-identified patent and that said Letters Patent is hereby corrected as shown below:

Column 6, Claim 1, Line 49, "form" should be --from--

Column 6, Claim 1, Line 49, prior to the word "which" insert -- and is disposed at a distance from said first side portion --

Signed and Sealed this

Twenty-second Day of September, 1992

*Attest:*

DOUGLAS B. COMER

*Attesting Officer*   Acting Commissioner of Patents and Trademarks